(No Model.)
P. SINSZ.
GLASS CUTTER GUIDE.
No. 308,709. Patented Dec. 2, 1884.
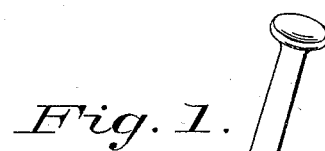
Fig. 1.
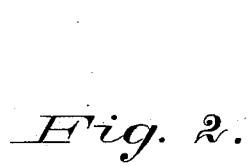
Fig. 2.
Fig. 3.   Fig. 4.
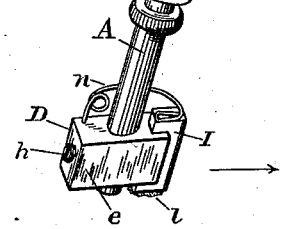
Fig. 5.
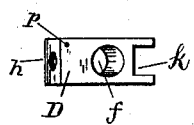
WITNESSES:
Edward A. Osse,
John E. Morris.
INVENTOR:
Philip Sinsz
By Chas B. Mann
Attorney.
N. PETERS. Photo-Lithographer. Washington, D. C.

UNITED STATES PATENT OFFICE.

PHILIP SINSZ, OF BALTIMORE, MARYLAND.

GLASS-CUTTER GUIDE.

SPECIFICATION forming part of Letters Patent No. 308,709, dated December 2, 1884.

Application filed September 25, 1884. (No model.)

*To all whom it may concern:*

Be it known that I, PHILIP SINSZ, a citizen of the United States, residing at Baltimore, in the State of Maryland, have invented certain new and useful Improvements in Glass-Cutter Guides, of which the following is a specification.

My invention relates to an improved guide for glass-cutters.

The improvement will first be described, and then the features comprising the invention will be designated in the claims.

In the accompanying drawings, which illustrate the invention, Figure 1 is a perspective view of a glass-cutter with my improvement. Fig. 2 is a vertical section of the guide, showing how the ferrule or diamond-holder is retained, also showing the wiper. Fig. 3 shows the set-screw, and Fig. 4 the plug which is forced against the ferrule by the set-screw. Fig. 5 is a top view of the guide.

The letter A designates the ordinary round ferrule which holds the diamond $b$, and C the handle, the end of which enters the ferrule. The guide D consists of a solid metal block with straight sides $e$, and having a hole, $f$, which the ferrule enters, and within which it may turn freely or loosely.

One feature of my invention consists of the means here shown for retaining the diamond-holder at any particular position in the guide to which it may be set, whereby the liability to of roughening the surface of the furrule is avoided. One end of the guide-block has a hole which enters in a direction about at a right angle to the ferrule-hole, and is occupied by the plug $g$ and the set-screw $h$. The plug may be made of any suitable metal or material which will not injure the ferrule. As shown in Fig. 2, it is in position to bear against the ferrule. The set-screw is on the outer side of the plug, and when the screw is turned the effect is to force the plug against the ferrule and thereby retain it in position or prevent it from moving. Although the screw turns, the plug does not turn, and this is one reason why the surface of the ferrule or diamond-holder is not bruised, as it is usually in the case of those devices where the set-screw bears directly against the ferrule. Another reason why the surface of the ferrule is not roughened or otherwise injured is that the plug which is in contact with the ferrule may be of a softer material than that composing the set-screw. The wiper-holder I is a tube which loosely occupies a groove, $k$, in one end of the guide-block. The wiper $l$ consists of a piece of sponge or other absorbent material to hold oil placed within the tube. The wiper-holder is kept in its position, and at the same time is pressed down so as to bear on the glass, by means of a spring, $n$, one end of which is attached to the guide-block at $p$, and the other end to the holder.

In cutting glass the tool is moved in the direction indicated by the arrow, the end of the tool to which the wiper is attached going forward.

Having described my invention, I claim—

1. A glass-cutter having a guide, a ferrule or diamond-holder loosely attached to the guide, a plug having position to bear against the said ferrule, and a set-screw to force the plug, as set forth.

2. A guide for glass-cutters, having a hole for the ferrule or diamond-holder, and another hole occupied by a plug, $g$, and a set-screw, $h$, to force the plug, as set forth.

3. A glass-cutter guide having at one end a groove, $k$, a tubular wiper-holder, I, loosely occupying the said groove, and a spring, $n$, one end of which is attached to the guide and the other end to the holder, as set forth.

In testimony whereof I affix my signature in presence of two witnesses.

PH. SINSZ.

Witnesses:
WM. B. NELSON,
CHAS. B. MANN.